United States Patent Office

2,844,551
Patented July 22, 1958

2,844,551

ALUMINUM COMPOUNDS AND THE PROCESS OF PREPARING THEM

Ludwig Orthner and Martin Reuter, Frankfurt am Main, Germany, assignors to Farbwerke Hoechst A. G., vormals Meister Lucius & Brüning, Frankfurt am Main Hochst, Germany, a company of Germany No Drawing. Application April 7, 1953
Serial No. 347,399

Claims priority, application Germany April 9, 1952

14 Claims. (Cl. 260—18)

The present invention relates to aluminum compounds and the process of preparing them.

From German Patent No. 569,946 it is known to react aluminum alcoholates with carboxylic acids in various proportions and subsequently to hydrolyze the reaction products with water. Thereby, well defined primary, secondary, and tertiary aluminum carboxylates are obtained. As far as the preparation of the primary and secondary salts of the formulae

is concerned, the corresponding mono- and di-carboxylic acid aluminum alcoholates of the formulae

are probably formed at first. By the subsequent treatment with water, the alkoxy groups are replaced by hydroxy groups.

Now, we have found that valuable aluminum compounds are obtained by reacting 1 mol of aluminum alcoholate with less than 1 mol of a monobasic organic substance of acid nature which forms aluminum salts, or with mixtures of such substances, if desired in the presence of an indifferent solvent.

If the reaction is carried out at low temperatures it is immaterial whether the aluminum alcoholate is first introduced and the mono-basic organic substances of acid nature are then added or whether the aluminum alcoholate is introduced into the mono-basic organic substances of acid nature or the solutions thereof.

The process may also be carried out in such a way that the reaction is performed at a low temperature, for instance a temperature below 40° C., preferably at room temperature, if desired while using only part of the components, and the reaction product is then heated to higher temperatures, if desired while adding the rest of the components. By its stepwise condensation, this process offers the advantage of a better control of the reaction and thus allows a more uniform production on an industrial scale.

It is also possible to perform the entire reaction at higher temperatures. In this case it may be advantageous to apply an elevated pressure.

In practicing the present invention, suitable aluminum alcoholates include, for example, those derived from low or medium aliphatic alcohols. There are mentioned, for instance: aluminum methylate, aluminum ethylate, aluminum propylate, aluminum isopropylate, aluminum butylate, aluminum isobutylate, aluminum amylate, aluminum hexylate, aluminum octylate, aluminum-2-ethylbutylate, aluminum-2-ethylhexylate, and the like, mixtures of these substances or mixed aluminum alcoholates.

Another aluminum alcoholate which can be used is the so-called α-aluminum ethylate. It is readily soluble in organic solvents and can be obtained, as described by Adkins (Journal of the American Chemical Society, vol. 44, page 2178), from amalgamated aluminum by means of absolutely anhydrous ethanol, or as described by Child and Adkins (Journal of the American Chemical Society, vol. 45, page 3014), by heating sparingly soluble β-aluminum ethylate for 15 hours to 275° C.

Further aluminum alcoholates which are suitable are those containing per 1 equivalent of aluminum less than 1 equivalent of organic radicals which are bound in an ethereal manner through oxygen.

As such radicals there can be used aliphatic, alicyclic, aromatic, araliphatic and heterocyclic hydrocarbon radicals, which may, if required, be substituted by non-acid groups such as the keto or ester group, halogen atoms such as chlorine atoms, or the amino group, or the carbon chain of which may be interrupted by heteroatoms such as oxygen, sulfur or nitrogen. There may be mentioned, for example: methyl, ethyl, chloroethyl, dimethyl, aminoethyl, isopropyl, butyl, octyl, octadecyl, cyclohexyl, phenyl, naphthyl, benzyl, phenylethyl, furfurmethyl, and the like. Several of the radicals indicated above can be bound simultaneously to the aluminum. Especially suitable aluminum alcoholates are those containing per 1 equivalent of aluminum about 0.5 to 0.9 equivalent of those radicals which are bound in an ethereal way.

The remaining valences of the aluminum, i. e. those which are not bound in an ethereal way, by means of oxygen, to organic radicals can be saturated for example with oxygen under linkage to further aluminum atoms, or with halogen, hydroxyl or organic acid radicals such as acetyl, and in this case several similar or different radicals mentioned above can simultaneously satisfy the remaining valences of the aluminum.

As aluminum alcoholates which contain per 1 equivalent of aluminum less than 1 equivalent of radicals which are bound in an ethereal way, by means of oxygen, there may be employed, for instance, those the solubility of which in organic solvents has been improved by thermal or hydrolytic treatment of normal aluminum alcoholates with splitting off of a part of the alkoxy groups, in most cases probably with linkage of aluminum atoms by way of oxygen atoms.

Among these aluminum alcoholates there may be mentioned, for example, the aluminum ethylates obtained by thermal treatment and corresponding to the empirical molecular formulae $Al_2(OC_2H_5)_4O$ and $Al_4(OC_2H_5)_6O_3$, as described by Henle (Berichte der deutschen chemischen Gesellschaft, vol. 53, page 720); the aluminum ethylate obtained by hydrolytic treatment, as described in German Patents Nos. 277,187 and 277,188, and containing about 2 ethoxyl radicals per atom of aluminum; the basic aluminum ethylate of the empirical molecular formula $Al(OH)(C_2H_5O)_2$ obtained by boiling with anhydrous alcohol with access of air, as described by Meerwein and Bersin ("Annalen," vol. 476, page 132); the aluminum-dihydroxocyclohexanolate obtained, as described by Meerwein and Bersin ("Annalen," vol. 476, page 132) by heating aluminum-cyclohexanolate at 275° C.; the basic aluminum ethylate obtained, as described by Bersin (Dissertation Konigsberg 1928), by boiling with not absolutely anhydrous ethanol, and containing about 2 ethoxyl groups per atom of aluminum. There may be further mentioned those aluminum alcoholates which can be obtained from aluminum alcoholates by reaction with slightly hydrous alcohols according to the process described by Tischtschenko (Chem. Zentralblatt 1900, I, page 12).

There can be further used those readily soluble aluminum alcoholates which are obtained by the reaction of metallic aluminum and slightly hydrous alcohols, advantageously in the presence of activating agents, and which contain per 1 equivalent of aluminum about 0.5 to 0.8 alkoxy groups.

As aluminum alcoholates containing halogen atoms there may be mentioned, for instance: readily soluble aluminum alcoholates containing halogen, corresponding for instance to the formula $AlHal(OR)_2$ or $Al_2Hal_3(OR)_3$, wherein R stands for low aliphatic radicals, such as $AlCl(OC_2H_5)_2$, and obtainable by causing aliphatic alcohols to react upon aluminum chloride, as described by Mpetse (Chemisches Zentralblatt, 1931, II, 1691).

Readily soluble aluminum alcoholates of that kind containing halogen can also be obtained, according to the process described in German Patent No. 859,143, by reacting a theoretically insufficient quantity of alcohols with aluminum halides in the presence of ammonia or amines. Furthermore, there may be mentioned: aluminum alcoholates containing halogen or being free from halogen and corresponding to the formula $AlHal_n(ORCl)_m$ $[n+m=3$, $m$ being at least 1, R standing for an alkylene radical]. These substances can be obtained by reacting aluminum halides with alkylene oxides, $AlCl(OC_2H_4Cl)_2$, for instance, can be obtained by reacting 2 moles of ethylene oxide with aluminum chloride.

In halogenated aluminum alcoholates of that kind, part of the radicals bound in an ether-like manner can, furthermore, be split off by thermal or hydrolytic after-treatment; it is probable that in most cases the aluminum atoms are linked together in chain-fashion through oxygen bridges.

Furthermore, there are mentioned aluminum compounds obtainable by thermal and/or hydrolytic treatment of carboxylic acid aluminum dialcoholates. This reaction leads to a partial separation of alkoxyl radicals and, probably, to the formation of chains between the aluminum atoms by means of the oxygen atoms. Thereby carboxylates of complex aluminum alcoholates of the formula $AlAcyl_x(OR)_yO_z$ in which the sum of $x$ and $y$ and $z$ reaches the value of 2.5–3, for instance $$Al_1(OC_2H_5)_1(CH_3COO)_1O_{0.5}$$

are for example obtained.

There can also be used mixtures of aluminum alcoholates having a reduced content of alkoxyl or mixtures of these alcoholates with normal aluminum alcoholates containing 3 alkoxyl groups.

Instead of the aluminum alcoholates, the products obtained by addition of carbon dioxide or sulfur dioxide to these alcoholates can also be used for the preparation of the solutions of the aluminum alcoholates. (Cf. Tischtschenko, Chemisches Zentralblatt 1900, I, page 585.) The said addition products are advantageously used whenever they are more stable in storage than the alcoholates themselves. When dissolving the addition compounds in inert solvents, especially in the heat, carbon dioxide or sulfur dioxide splits off and the alcoholates are regenerated.

The aluminum alcoholates can also be used in the form of their alkoxo acids and/or in a form stabilized against moisture by means of volatile organic substances capable of forming complex compounds.

As mono-basic organic substances of an acid nature capable of forming salts with aluminum and suitable for the manufacture of reaction products with aluminum alcoholate, there may be mentioned, for example: mono-carboxylic acids, mono-sulfinic acids, mono-sulfonic acids, mono-sulfuric acid esters, mono-sulfamic acids, mono-basic phosphonic acids, mono-basic phosphoric acid esters, diacylamides containing carboxyl and/or sulfonyl radicals, sulfamides and the like. Instead of mono-carboxylic acids, their anhydrides can be used as well, because they are converted into free acids and indifferent esters with the traces of alcohol which inevitably adhere to the aluminum alcoholates. Instead of mono-basic esters dicarboxylic anhydrides can also be used which form likewise mono-basic esters with the traces of alcohol which are always present.

These compounds can belong to the aliphatic, isocyclic, aromatic or heterocyclic series and can contain further indifferent substituents of neutral nature, for instance halogen atoms, or groups, such as the groups OH or SH, or ether, thioether or ester groups, carboxylic acid amide or urea groups or the like. This chain of carbon atoms can be interrupted by heteroatoms such as O, N, or S.

As aliphatic mono-carboxylic acids may be mentioned, for example: formic acid, acetic acid, propionic acid, butyric acid, caproic acid, caprylic acid, capric acid, stearic acid, oleic acid, palmitic acid, lauric acid, myristic acid, behenic acid, montanic acid, mixtures of acids obtained by oxidation of paraffin, resin acids, such as abietic acid or colophony. Instead of single acids there can also be used mixtures of the acids mentioned or mixtures of acids which are obtained from natural products, if necessary hydrogenated. Mixtures of this kind are, for instance, the fatty acids of sperm oil, coconut oil, tall oil, linseed oil, soy bean oil, fish oil, cottonseed oil, train oil, peanut oil, sulfocarbon oil, rape oil, tallow animal oil, bone fat, lard, tung oil. There may further be mentioned, for example, acrylic acid or methacrylic acid, crotonic acid, methoxyacetic acid, ethoxyacetic acid, butoxyacetic acid, dodecyloxyacetic acid, chloroacetic acid, $\alpha$-chloropropionic acid, $\beta$-chloropropionic acid, $\alpha$-chlorobutyric acid, thioglycolic acid, thiolactic acid, malonic acid mono-ethyl ester, oxalic acid mono ethyl ester, the semi-amide of malonic acid, hydantoic acid, glycolic acid, lactic acid, $\beta$-hydroxybutyric acid, the mono-ethyl ester of maleic acid, propylsulfamido acetic acid, dodecylsulfamido acetic acid, and mixtures of aliphatic alkylsulfamido acetic acids.

As alicyclic mono-carboxylic acids can be used, for instance: cyclopentane-carboxylic acid, cyclohexane-carboxylic acid, hexahydro-salicylic acid or analogous acids.

As aromatic mono-carboxylic acids are mentioned, for instance: benzoic acid ortho-chlorobenzolic acid, 4-chlorobenzoic acid, 2-methyl-benzoic acid, 3-methyl-benzoic acid, 4-methyl-benzoic acid, $\alpha$-naphthoic acid, $\beta$-naphthoic acid, $\alpha$-naphthoxy acetic acid, $\beta$-naphthoxy-acetic acid, phenyl-acetic acid, cinnamic acid, phthalic acid-mono-ethyl ester, salicylic acid, 2.3-hydroxynaphthoic acid, 3-hydroxybenzoic acid, 4-hydroxybenzoic acid, methoxybenzoic acid, phenoxy-acetic acid, 2.4-dichlorophenoxy-acetic acid, the semi-amide of phthalic acid, paratoluenesulfamido-acetic acid, and the like. As heterocyclic mono-carboxylic acids may be mentioned, for example: pyromucic acid, nicotinic acid, thiophene-$\alpha$-carboxylic acid, 2-hydroxy-carbazole-3-carboxylic acid, 3 - hydroxy-diphenylene-oxide-2-carboxylic acid, 1-phenylpyrazolone (5) - 3 - carboxylic acid, 5 - benzoyl-benzoxazolone-2-carboxylic acid, 3 - hydroxy-2-methyl-quinoline-4-carboxylic acid, pyrrole-$\alpha$-carboxylic acid, $\beta$-indolyl-acetic acid.

For the reaction with the aluminum alcoholate carboxylic anhydrides can also be used according to the process described in German Patent No. 853,354, such as acetic anhydride, propionic anhydride, lauric anhydride, benzoic anhydride, stearic anhydride, phthalic anhydride, succinic anhydride, maleic anhydride, 4-chlorophthalic anhydride, 3.6-dichlorophthalic anhydride, tetrachlorophthalic anhydride, tetrahydrophthalic anhydride and similar products obtained by the diene-synthesis with maleic anhydride. Furthermore, mono-basic diacyl-amides of carboxylic acids, such as diacetamide, dilauryl-amide, dibenzamide, phthalimide and the like may also be used.

As organic mono-sulfinic acids enter into consideration, for instance: the sulfinic acids of ethane, propane, dodecane, cyclohexane, benzene.

As organic mono-sulfonic acids may be mentioned, for example: propanesulfonic acid, dodecanesulfonic acid, cyclohexanesulfonic acid, benzenesulfonic acid, paratoluene-sulfonic acid, naphthalenesulfonic acid, octylbenzene-sulfonic acid, butylnaphthalene-sulfonic acid, hydroxyethane-sulfonic acid, phenolsulfonic acid, naphtholsulfonic acid, 2-hydroxy-carbazole - 7 - sulfonic acid, thiophene-α-sulfonic acid. There can, furthermore, be used the mono-basic amides and imides of sulfonic acids of the said kind, such as dodecanesulfamide, benzenesulfamide, para-toluenesulfamide, benzene-disulfimide, para-toluene-disulfimide, dodecanedisulfimide, propanesulfamide, propane-disulfimide.

There can also be applied, for instance, the mono-basic sulfinic and sulfonic acids, the sulfamides and sulfimides from mixtures of hydrocarbons of middle or higher molecular weight which can be obtained, for example, by known processes from the sulfochlorides of fossil and synthetic diesel oils or by sulfonation of petroleum distillates an dalkylbenzenes.

As mono-sulfuric esters are mentioned, for instance: ethylsulfuric acid esters, butylsulfuric acid esters, dodecylsulfuric acid esters, cyclohexylsulfuric acid esters, phenylsulfuric acid esters, alkylphenylsulfuric acid esters, stearylsulfuric acid esters, benzylsulfuric acid esters.

As mono-basic organic sulfamic acids may be mentioned for example: ethylsulfamic acid, dodecylsulfamic acid, cyclohexylsulfamic acid, phenylsulfamic acid.

Furthermore, there come into question, for example, mono-basic acid cyclic imides: benzoic acid sulfimide, barbituric acid, ethylbarbituric acid.

As mono-basic organic phosphonic acids can be used, for instance: the mono-esters of phosphonic aliphatic or alicyclic alcohols, such as the mono-ethylester of the cyclohexane-phosphonic acid of the formula $$C_6H_{11}PO(OC_2H_5)OH$$

and the corresponding amyl ester, the ethyl, amyl, dodecyl, or cyclohexyl esters of hexanephosphonic acid, or the ethyl, butyl, dodecyl, or cyclohexyl esters of phenylphosphonic acid.

As mono-basic phosphoric acid esters are used, for example: the dialkyl esters of phosphoric acid of the formula 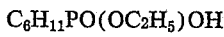 [R=aliphatic or alicyclic radical] such as the diethyl, dibutyl, diamyl, didodecyl, dibenzyl, dioctadecyl or dicyclohexyl esters of phosphoric acid.

There can also be used mixtures of these compounds; it is also possible to react several compounds one after the other with the aluminum alcoholate, for instance, first acetic acid, then benzoic acid or 2.3-hydroxy-naphthoic acid.

The gradual use of the said acid organic compounds and carboxylic acids of high molecular weight in the reaction with the aluminum alcoholate is of particular advantage. Thus it is possible, for instance, to react the latter first with 0.2-0.8 mol of acetic acid and then with 0.1-0.7 mol of stearic acid, however, only with at most about 0.9 mol of acid in total.

Particularly valuable products, i. e. products which are to a far-reaching extent stable to moisture, especially at ordinary temperature, are obtained by treating the reaction products with volatile organic compounds capable of forming complex compounds. These compounds can also be added before or during the reaction of the alcoholates with the mono-basic organic substances having an acid nature and forming salts with aluminum. The products thus obtained are stable to atmospheric moisture and water at low temperatures; the reaction products obtained from aluminum alcoholates and the said mono-basic organic compounds of acid nature and stabilized to a far-reaching extent may, under certain circumstances, even be used in an aqueous medium without hydrolytic cleavage taking place at low temperatures. The above-mentioned substances capable of forming complex compounds are advantageously added in the liquid or the dissolved state at ordinary or raised temperatures in quantities of about 0.1-2 mols according to the desired degree of stabilization.

As volatile organic substances capable of forming complex compounds there may be mentioned: compounds containing a feebly acid group, for instance, aliphatic hydroxycarboxylic acid esters such as tartaric acid diethyl ester, or oximes, for instance acetone-oxime, acetaldehyde-oxime; furthermore, compounds containing a group capable of desmotropic rearrangement to the aciform, for instance, acetylacetone, acetoacetic ester, malonic acid dinitrile, nitromethane, nitropropane or the like; furthermore, compounds containing a reactive methylene group, for instance malonic acid esters; hydroxy-oxo-compounds such as butyroin and aliphatic nitriles such as acetonitrile, enter also into consideration. As indifferent solvents there may be used chlorinated hydrocarbons or hydrocarbons such as benzine, benzene, xylene, carbon tetrachloride, trichlorethylene, perchlorethylene, chlorobenzene, furthermore, esters of low boiling point such as ethyl acetate, amyl acetate, dialkyl ethers such as diethyl ether, cyclic ethers such as dioxan or the like.

In the reaction of the aluminum alcoholates with the mono-basic organic compounds having an acid nature and forming salts with aluminum it is most probable that the acid aluminum alcoholate at first formed by replacement of an alkoxy group by the equivalent quantity of acid radicals, reacts with the aluminum alcoholate in excess whereby filamentary molecules may be formed which, if desired, can be cross-linked furthermore. According to the molecular proportion of the reaction components and the reaction conditions, the number of the ether and acid radicals present may vary. When working at lower temperatures, the chain-length and the degree of the formation of cross-linkages seem to be far inferior to those obtained when working at higher temperature so that the resultant products dissolve more readily in organic solvents.

The great number of aluminum alcoholates and mono-basic organic acid substances or their derivatives which are suitable for the present reaction allows of adapting in a very favorable way the properties of the resultant organic aluminum compounds to the uses to which they are to be put. The aluminum compounds obtained have an oily to semisolid or a waxy or resin-like consistency. They are soluble in many organic solvents and compatible with plasticizers. They can be applied on a technical scale for many purposes, for instance, in the lubricant, propellant, and varnish industries.

Reference is made to our patent application Serial No. 347,400, entitled "Process for Rendering Fibrous Materials Water-Repellent," filed April 7, 1953, now U. S. Patent No. 2,801,190, issued July 30, 1957.

The following examples serve to illustrate the invention but they are not intended to limit it thereto; the parts being by weight:

Example 1

To 104 parts (=0.64 mol) of aluminum ethylate dissolved in 634 parts of ethyl acetate there are added 80 parts (=0.29 mol) of stearic acid (solidification point 55° C., molecular weight 272) and the mixture so obtained is boiled for 1 hour under reflux. Then the solvent is distilled off, at first under atmospheric pressure and subsequently under reduced pressure. A residue of 162 parts of a soft wax is obtained which is soluble in hot carbon tetrachloride.

Example 2

To 50 parts (=0.31 mole) of aluminum ethylate dissolved in 300 parts of ethyl acetate there are added 60 parts (=0.22 mol) of commercial stearic acid (solidification point 55° C., molecular weight 272) and the mixture so obtained is boiled for 2 hours under reflux. The solvent is then distilled off, at first under normal pressure and subsequently under reduced pressure. A residue of 89 parts of a soft, tough resin is obtained which is soluble in hot carbon tetrachloride.

*Example 3*

128 parts (=0.63 mol) of aluminum isopropylate are dissolved in 280 parts of benzene and then 100 parts (=5.35 mol) of stearic acid (solidification point 65° C., molecular weight 282) are added and the mixture so obtained is boiled for 1 hour under reflux. The solvent is then distilled off, at first under normal pressure and subsequently under reduced pressure. A residue of 180 parts of a viscous oil is obtained which is soluble in cold carbon tetrachloride and in hot benzene and hot petroleum ether.

*Example 4*

150 parts (=0.57 mol) of sperm oil fatty acid (acid number 212, iodine number 70.5) are added to 104 parts (=0.64 mol) of aluminum ethylate dissolved in 634 parts of ethyl acetate and the mixture so obtained is boiled for 1 hour under reflux. The solvent is then distilled off, at first under normal pressure and finally under reduced pressure. A residue of 215 parts of a soft, tough wax is obtained which is soluble in hot carbon tetrachloride.

*Example 5*

110 parts of stearic acid (solidification point 55° C., molecular weight 270) are dissolved at 40° C., while stirring, in 1100 parts of a solution of commercial aluminum ethylate in ethyl acetate (2.2 percent Al) obtained according to German Patent No. 386,688. The mixture thus obtained is then boiled for 2 hours under reflux, and subsequently the solvent is distilled off, first under normal pressure and finally under reduced pressure. 225 parts of a viscous oil are obtained which, at room temperature, solidifies to a tough wax and is soluble in hot carbon tetrachloride and benzene.

When proceeding in the same manner but using, instead of the stearic acid, 191 parts of sperm oil fatty acid (acid number 212, saponification number 214, iodine number 71) 580 parts of a viscous oil are obtained which still contains a little ethyl acetate. This product solidifies at room temperature with formation of a gelatin which, after being caused to swell, is soluble in hot carbon tetrachloride.

*Example 6*

120 parts of stearic acid (solidification point 55° C., molecular weight 270) are dissolved at 40° C., while stirring, in 1100 parts of a solution of commercial aluminum ethylate in ethyl acetate (2.2 percent Al) obtained according to German Patent No. 386,688. The mixture is then boiled for 1 hour under reflux and to the clear solution thus obtained 110 parts of commercial castor oil fatty acid (acid number 178, saponfication number 197, iodine number 85, 2.2 percent OH) are added at 70° C., while stirring, and the mixture is again boiled for 1 hour under reflux. The solvent is then distilled off, finally under reduced pressure. A yellowish, soft, rubber-like resin is obtained which is soluble in cold benzene while swelling.

When proceeding in the same manner but using, instead of the solution of commercial aluminum ethylate in ethyl acetate, 1800 parts of a 10 percent solution of aluminum isopropylate in benzene, 420 parts of a soft, rubber-like resin are obtained which, after being caused to swell at room temperature, is soluble in hot benzene.

*Example 7*

266 parts of aluminum chlorethylate obtained from aluminum chloride and 3 mols of ethylene oxide are dissolved at 60° C. in 800 parts of benzene and then 140 parts of commercial stearic acid (solidification point 52° C.) are added while stirring. A clear solution of a condensation product of aluminum chlorethylate and stearic acid is obtained. From this solution the benzene and the eliminated chlorethyl alcohol are then distilled off, at first under normal pressure and finally under reduced pressure while taking care that the temperature in the reaction product or mixture rises to 120° C.

The condensation product of aluminum chlorethylate and stearic acid remains as a yellowish, thick oil which solidifies slowly at room temperature to a soft wax which is easily soluble at room temperature, for example, in carbon tetrachloride, benzene and test benzine.

When proceeding in the same manner as described above but using, instead of the aluminum chlorethylate, 411 parts of aluminum dichloropropylate produced in the same way from aluminum chloride and 3 mols of epichlorohydrin or 308 parts of aluminum bromopropylate produced from aluminum bromide and 3 mols of propylenoxide, analogous condensation products of aluminum alcoholate and stearic acid are obtained.

When instead of stearic acid, 240 parts of commercial sperm oil fatty acid (acid number 212, saponification number 214, iodine number 71) are reacted in the manner described above with aluminum chlorethylate, the condensation product of aluminum chlorethylate and sperm oil fatty acid is obtained as a viscous oil at normal temperature; it likewise dissolves readily in carbon tetrachloride, benzene, and test benzine.

*Example 8*

120 parts of aluminum methylate are dispersed, while stirring, in 3000 parts of benzene, 250 parts of stearic acid (solidification point 52° C., molecular weight 278) are added and the mixture so obtained is boiled for 1 hour under reflux. Methanol separates and a viscous solution of the condensation product of aluminum methylate and stearic acid is obtained. The solvent and the separated methanol are then distilled off under reduced pressure and an elastic resin is obtained as residue which is soluble in benzene, xylene and perchlorethylene.

When proceeding in the same manner but using, instead of the stearic acid, an equal amount of oleic acid (solidification point +10° C.) or abietic acid or colophony or else 335 parts of montanic acid (molecular weight 372), the condensation product of aluminum methylate and oleic acid or abietic acid or montanic acid, respectively, is obtained as a resin which is likewise soluble in xylene.

*Example 9*

246 parts of aluminum-n-butylate are dissolved, while stirring, in 1000 parts of hot n-butanol and 100 parts of a mixture of fatty acids obtained by oxidation of paraffin (average molecular weight 170, solidification point 27° C.) are added to the solution at 50° C. Butanol separates and a clear solution of the condensation product of aluminum butylate and the fatty acid mixture above mentioned is obtained. This solution is boiled for 1 hour under reflux. After distilling off the butanol under reduced pressure, an oil solidifing in the form of a wax is obtained as residue which is soluble in xylene and perchlorethylene.

When proceeding in the same manner, but using instead of the above fatty acid mixture the corresponding amount of naphthenic acid (acid number: 356), the condensation product of aluminum butylate and naphthenic acid is obtained in the form of a wax which is soluble in xylene and perchlorethylene.

*Example 10*

27 parts of commercial fatty acid from sperm oil are dissolved at 20° C., while stirring, in 200 parts of a 10 percent solution of aluminum ethylate in xylene. After allowing the whole to stand for 12 hours at 20° C., the solution is heated at 45° C. for 10 hours in the absence of air and moisture. After distilling off the solvent under reduced pressure, a tough wax is obtained which dissolves while swelling at room temperature in carbon tetrachloride and benzene and yields viscous solutions.

Example 11

1100 parts of a solution of the condensation product of aluminum ethylate and stearic acid in ethyl acetate, which solution has been prepared by reacting for 3 hours at 20° C. 0.8 mol of stearic acid with commercial aluminum ethylate solution in ethyl acetate (prepared according to the German Patent No. 386,688 and containing 2.2 percent Al), are heated for 4 hours to 40° C. The solvent is then distilled off at 60° C. A tough wax is obtained which is soluble in carbon tetrachloride, benzene and benzine and can be molten with paraffin hydrocarbons with formation of homogeneous products.

Example 12

7 parts of stearic acid are dissolved at 50° C. in 210 parts of a benzene solution of the condensation product of aluminum isopropylate and oleic acid produced by causing to react for 1 hour at 20° C. 13.5 parts of oleic acid with the solution of 20 parts of aluminum isopropylate in 176 parts of benzene. The solution so obtained is then boiled for 1 hour under reflux and subsequently the solvent is distilled off, finally under reduced pressure. A highly viscous, yellowish oil is obtained which solidifies at room temperature. The product is soluble in carbon tetrachloride and benzene.

Example 13

204 parts of aluminum isopropylate are dissolved in a mixture of 800 parts of isopropanol and 800 parts of xylene and to this solution 48 parts of glacial acetic acid diluted with 500 parts of xylene are added drop by drop, while stirring, at 30° C. Slight spontaneous heating of the reaction mixture takes place and a clear solution of the condensation product of aluminum isopropylate and acetic acid is obtained. By stirring for 1 hour at 80° C. a viscous solution is obtained which, after removal of the solvent by distillation under reduced pressure at about 90° C., yields the condensation product of aluminum isopropylate and glacial acetic acid in the form of a brittle resin which is soluble in benzene and xylene. By using, instead of glacial acetic acid, 75 parts of chloroacetic acid, and proceeding otherwise in the same manner, the condensation product of aluminum isopropylate and chloroacetic acid is obtained in the form of a brittle resin which is soluble in benzene, xylene and carbon tetrachloride.

Example 14

204 parts of aluminum isopropylate are dissolved in 1000 parts of xylene and at about 30° C. a solution of 30 parts of glacial acetic acid in 500 parts of xylene is run in, while stirring and cooling from outside. A viscous solution of a condensation product of aluminum isopropylate and acetic acid is obtained in which 120 parts of commercial stearic acid (molecular weight 270, solidification point 52° C.) are dissolved at 70° C., while stirring. After the xylene and the eliminated isopropanol have been distilled off under reduced pressure, the condensation product of acetic aluminum isopropylate and stearic acid is obtained in the form of an elastic resin which is soluble in aliphatic and aromatic hydrocarbons, such as test benzine and xylene.

By using, instead of stearic acid, and equal amount of commercial fatty acid from sperm oil (acid number 210; saponification number, 214; iodine number, 71) or 60 parts of an American naphthenic acid of the average molecular weight of 170, and distilling at 150° C.–160° C./12 mm., and proceeding otherwise in the same manner, the condensation product of acetic aluminum isopropylate and the fatty acid from sperm oil or naphthenic acid, respectively, is obtained in the form of resins which are soluble in aromatic hydrocarbons.

By using, instead of glacial acetic acid, 45 parts of chloroacetic acid or 46 parts of thioglycollic acid, and proceeding otherwise in the same manner, the condensation product of chloroacetic or thioglycollic aluminum isopropylate and stearic acid is obtained in the form of elastic resins which are soluble in test benzine and xylene.

Example 15

30 parts of glacial acetic acid are added drop by drop at about 30° C., while stirring and cooling, to 1000 parts of a solution of commercial aluminum ethylate in ethyl acetate (2.7 percent Al), prepared according to German Patent No. 386,688. In the clear solution of acetic aluminum ethylate thus obtained there are dissolved at about 50° C., while stirring, 110 parts of commercial stearic acid (molecular weight 275, solidification point 52° C.) and the clear solution of the condensation product of acetic aluminum ethylate and stearic acid is boiled for 1 hour under reflux. After distilling off the ethyl acetate and the eliminated ethyl alcohol, a soft resin is obtained as residue which is soluble in carbon tetrachloride, benzene, xylene, and test benzine.

By using, instead of the stearic acid, 80 parts of lauric acid or, instead of the glacial acetic acid, 23 parts of formic acid, and proceeding otherwise in the same manner, the condensation product of acetic or formic aluminum ethylate and lauric acid or stearic acid, respectively, is obtained in the form of resins which are soluble in xylene.

Example 16

40 parts of acetic anhydride are added drop by drop, while stirring, at about 30° C. to 1000 parts of commercial aluminum ethylate dissolved in ethyl acetate (2.7 percent Al). Spontaneous heating of the solution takes place and ethyl acetate is split off. A clear solution of the acetic aluminum ethylate is obtained, in which 110 parts of palmitic acid are dissolved, while stirring, at about 40° C.; the clear solution is boiled under reflux for a further hour. The solvent is then distilled off yielding the condensation product of acetic aluminum ethylate and palmitic acid in the form of a tough wax, which is soluble in carbon tetrachloride, test benzine, and xylene.

By using, instead of acetic anhydride, 50 parts of propionic anhydride or, instead of palmitic acid, stearic acid, and proceeding otherwise in the same manner, the condensation product of propionic or acetic aluminum ethylate and palmitic acid or stearic acid, respectively, is obtained as a wax which is soluble in xylene.

Example 17

1476 parts of aluminum-n-butylate are dissolved in 4000 parts of benzene; in this solution 366 parts of benzoic acid are dissolved, while stirring, at 40° C. and the solution thus obtained is stirred at 70° C. for a further hour. A viscous solution of the condensation product of aluminum butylate and benzoic acid is obtained. After distilling off the benzene and the eliminated butanol, the product is obtained as a brittle resin which is soluble in xylene. By using, instead of benzoic acid, 471 parts of 4-chlorobenzoic acid or 516 parts of α-naphthoic acid, the condensation product of aluminum butylate and 4-chlorbenzoic acid or α-naphthoic acid is obtained as a resin which is soluble in xylene.

The resin of aluminum butylate and benzoic acid can also be produced without the addition of a solvent, by introducing, while stirring, the benzoic acid into the molten aluminum butylate, stirring the melt for a further hour, and subsequently distilling off the butanol which has been eliminated.

Example 18

102 parts of aluminum isopropylate are dissolved in 1000 parts of boiling isopropyl alcohol; the solution thus obtained is cooled to about 40° C. and 120 parts of dibenzene sulfimide are dissolved therein, while stirring. A clear solution of the condensation product of aluminum isopropylate and dibenzene sulfimide is obtained which is boiled for a further hour under reflux. After distilling off the isopropanol and cooling, a soft resin is obtained as residue which is soluble in chlorinated aliphatic hydrocarbons, such as carbon tetrachloride, and in aromatic hydrocarbons, such as benzene and xylene.

By using, instead of dibenzene-sulfimide, 132 parts of di-para-toluene-sulfimide, and proceeding otherwise in the same manner, the condensation product of aluminum isopropylate and di-para-toluene-sulfimide is obtained as a resin which is soluble in carbon tetrachloride and xylene.

Example 19

To 1000 parts of a solution of commercial aluminum ethylate in ethyl acetate (2.7 percent of aluminum), diluted with 1000 parts of anhydrous alcohol, 124 parts of salicylic acid are added, while stirring, at about 20° C., and the mixture is boiled for 1 hour under reflux. A clear solution of the condensation product of aluminum ethylate and salicylic acid is formed. The solvent and the eliminated ethanol are removed by distillation under reduced pressure, and a brittle resin is obtained which is soluble in ethyl acetate and alcohol.

When proceeding in the same manner but using, instead of salicylic acid, 170 parts of 2-hydroxynaphthalene-3-carboxylic acid, the condensation product of aluminum ethylate and the 2-hydroxynaphthalene-3-carboxylic acid is obtained in the form of a resin soluble in ethyl acetate and alcohol.

Example 20

To 1000 parts of a solution of commercial aluminum ethylate in ethyl acetate (2.7 percent of aluminum) there is added, while stirring, the solution of 86 parts of para-toluenesulfonic acid in 800 parts of anhydrous alcohol. The resultant solution of the condensation product is boiled for 1 hour under reflux. The solvents are then distilled off from the clear solution, finally under reduced pressure. As residue the condensation product of aluminum ethylate and para-toluene-sulfonic acid is obtained in the form of a brittle resin soluble in anhydrous alcohol.

When proceeding in the same manner but using, instead of para-toluenesulfonic acid, 80 parts of benzensulfonic acid or 160 parts of an alkyl sulfonic acid of the average molecular weight of 300 [obtained in known manner from a mixture of synthetic hydrocarbons (distilling over between 230° C. and 320° C., and having carbon atom chains of an average length of about $C_{16}$, and an average molecular weight of about 220), by semisulfochlorination of these hydrocarbons followed by hydrolysis to the sulfonic acid and separation of the unsaponifiable matter], the condensation product of aluminum ethylate and benzenesulfonic acid or alkylsulfonic acid is obtained in the form of resins soluble in alcohol.

Example 21

To 1000 parts of a solution of commercial aluminum ethylate in ethyl acetate (2.7 percent of aluminum) there is added, while stirring, at temperatures from about 20° C. to about 30° C., the solution of 124 parts of the mono-2-ethylbutyl ester of cyclohexanephosphonic acid, corresponding to the formula $C_6H_{11}PO(OC_6H_{13})OH$, in 500 parts of ethyl acetate, and the clear mixture is boiled for 1 hour under reflux. From the clear solution of the condensation product thus obtained the solvent is distilled off, and the product is obtained as a brittle resin which is soluble in carbon tetrachloride, test benzine and xylene.

When proceeding in the same manner but using, instead of the mono-2-ethyl-butyl ester, 95 parts of mono-ethyl ester or 117 parts of mono-amyl ester or 116 parts of mono-dodecylester of cyclohexane-phosphonic acid or the corresponding amounts of the same mono-esters of phenylphosphonic acid or hexanephosphonic acid, the corresponding condensation products of aluminum ethylate and the respective esters of the phosphonic acids are obtained in the form of resin-like substances, soluble in xylene.

Example 22

204 parts of aluminum isopropylate are dissolved in 1000 parts of xylene, and the solution of 105 parts of di-n-butyl ester of phosphoric acid of the formula $$PO(OC_4H_9)_2OH$$

in 500 parts of xylene is added at about 30° C. The clear solution is then heated for 1 hour to about 70° C. The solvent is distilled off under reduced pressure, and the condensation product of aluminum isopropylate and the dibutyl ester of phosphoric acid is obtained in the form of a wax which is soluble in aliphatic and aromatic hydrocarbons and chlorinated hydrocarbons.

When proceeding in the same manner but using, instead of the dibutyl ester, 77 parts of diethyl ester or 119 parts of diamyl ester or 217 parts of di-dodecyl ester or 301 parts of di-octadecyl ester or 138 parts of dibenzyl ester of phosphoric acid, the corresponding condensation products of aluminum isopropylate and the respective esters of the dialkylphosphoric acid are obtained in the form of waxes which are soluble in aliphatic or aromatic hydrocarbons and chlorinated hydrocarbons.

Example 23

To 1000 parts of a solution of commercial aluminum ethylate in ethyl acetate (2.7 percent of aluminum) a solution of 72 parts of anhydrous lactic acid in 600 parts of anhydrous alcohol is added at about 30° C., while stirring. The clear solution of the condensation product obtained is boiled for 1 hour under reflux. The solvents are then distilled off, and a brittle resin is obtained as residue which is soluble in anhydrous alcohol.

When proceeding in the same manner but using, instead of lactic acid, 51 parts of anhydrous glycollic acid or 83 parts of β-hydroxybutyric acid, the condensation product of aluminum ethylate and glycollic or hydroxy-butyric acid is obtained in the form of a resin soluble in anhydrous alcohol.

When proceeding in the same manner but using only 36 parts of lactic acid and subsequently adding 112 parts of stearic acid, the condensation product of lactic aluminum ethylate and stearic acid is obtained as a brittle resin which is soluble in anhydrous alcohol.

Example 24

To a solution of 245 parts of aluminum-n-butylate in 840 parts of xylene there are added, while stirring, at about 50° C., 114 parts of benzenesulfinic acid which has been prepared recently, whereby a clear solution of the condensation product of aluminum butylate and benzenesulfinic acid is formed with elimination of butanol. The solvent is distilled off at about 70° C. under reduced pressure (10 millimeters of mercury), and a soft resin is obtained as residue which is soluble in xylene, benzene, carbon tetrachloride and ethyl acetate.

When proceeding in the same manner but using, instead of benzenesulfinic acid, 112 parts of cyclohexane-sulfinic acid or 78 parts of para-toluenesulfinic acid or 240 parts of alkylsulfinic acid of an average molecular weight of 280 [obtained in known manner from a hydrocarbon fraction, produced by hydrogenation of carbon monoxide by the Fischer-Tropsch method (distilling at temperatures between 230° C. and 320° C. and having an average molecular weight of about 220 and an average chain length of about $C_{16}$), by semisulfochlorination, reaction with sodium sulfite, and separation of the unsaponifiable matter], the condensation product of aluminum butylate and cyclohexane or para-toluene or alkyl-sulfinic acid is obtained in the form of a soft resin soluble in xylene.

Example 25

246 parts of aluminum-n-butylate are dissolved with 1000 parts of hot anhydrous n-butanol, and 120 parts of phthalic anhydride are added, while stirring, at about 60° C. A clear solution of the condensation product of aluminum butylate and mono-butyl ester of phthalic acid is obtained, which is heated for 1 hour at about 100° C. The butanol is distilled off, finally under reduced pressure, and a resin is obtained as residue which is soluble in butanol, carbon tetrachloride, benzene and xylene.

When proceeding in the same manner but using, instead of phthalic anhydride, 150 parts of 4-chloro-phthalic anhydride, the condensation product of aluminum butylate and mono-butyl ester of chlorophthalic acid is obtained as a resin which is soluble in butanol.

When proceeding in the same manner but using, instead of aluminum butylate dissolved in butanol, 1000 parts of a solution of commercial aluminum ethylate in ethyl acetate (2.7 percent of aluminum) and adding 1000 parts of anhydrous alcohol, the condensation product of aluminum ethylate and mono-ethyl ester of phthalic acid is obtained in the form of a brittle resin soluble in ethanol.

Example 26

In 1000 parts of a solution of commercial aluminum ethylate in ethyl acetate (2.7 percent of aluminum) 200 parts of benzoic anhydride are dissolved, while stirring, at about 20° C. Ethyl benzoate is split off and a clear solution of the condensation product of aluminum ethylate and benzoic acid is obtained, which is boiled for 1 hour under reflux. First the solvent is distilled off and, finally, under reduced pressure (0.5 millimeter of mercury), the benzoic acid ethyl ester. The condensation product is obtained in the form of a resin which is soluble in carbon tetrachloride and xylene.

When proceeding in the same manner but using, instead of benzoic anhydride, 500 parts of stearic anhydride, the condensation product of aluminum ethylate and stearic acid is obtained as a resin soluble in xylene.

Example 27

120 parts of aluminum methylate are boiled, while stirring, for 1 hour under reflux in 3000 parts of benzene with 36 parts of glacial acetic acid, whereby methanol is split off and a viscous solution of acetic aluminum methylate is formed. 81 parts of stearic acid (solidification point 50° C., molecular weight 270) are then added, while stirring, at about 70° C., and the mixture is boiled for a further hour under reflux. Methanol is split off and a viscous solution of the condensation product of acetic aluminum methylate and stearic acid is formed. The solvent and the methanol are distilled off, and an elastic resin is obtained which is soluble in xylene, benzene and perchlorethylene.

When proceeding in the same manner but using, instead of stearic acid, the corresponding amount of oleic acid or abietic acid or colophony or 100 parts of montanic acid (molecular weight 335), the condensation product of acetic aluminum methylate and oleic or abietic or montanic acid is obtained in the form of a resin soluble in xylene.

Example 28

To 1000 parts of a solution of commercial aluminum ethylate in ethyl acetate (2.7 percent of aluminum) 60 parts of phthalimide are added, while stirring. The mixture is boiled for 1 hour under reflux. Ethanol is split off and a clear solution of the condensation product of aluminum ethylate and phthalimide is formed. The solvent is distilled off and a brittle resin is obtained which is soluble in anhydrous alcohol, xylene and perchlorethylene.

When proceeding in the same manner but using, instead of phthalimide, 40 parts of succinimide or 100 parts of pyromucic acid, the condensation products of aluminum ethylate and succinimide or pyromucic acid are obtained in the form of brittle resins which are soluble in anhydrous alcohol.

Example 29

204 parts of aluminum isopropylate are dissolved in 1000 parts of xylene, 225 parts of n-dodecanesulfamide are added, while stirring, and the mixture is boiled for 1 hour under reflux, while stirring. Isopropanol is split off and a clear solution of the condensation product of aluminum isopropylate and dodecanesulfamide is formed. The solvent is distilled off, finally under reduced pressure, and as residue an oil is obtained that solidifies to a wax readily soluble in carbon tetrachloride and xylene.

When instead of n-dodecanesulfamide 150 parts of paratoluenesulfamide are used, the condensation product of aluminum isopropylate and toluenesulfamide is obtained in the form of a wax which is soluble in anhydrous alcohol, xylene and perchlorethylene.

When proceeding in the same manner but using, instead of n-dodecanesulfamide, 500 parts of a mixture of aliphatic sulfamides, obtainable in known manner from a synthetic diesel oil (distilling at a temperature between about 200° C. and about 250° C. and having an average chain length of about $C_{16}$) by semisulfochlorination, formation of amide without separation of the unsaponifiable matter (content of disulfamide=11 percent), an oily and viscous solution of the condensation product of aluminum isopropylate and alkylsulfamide in diesel oil is obtained, which solution forms clear mixtures with test benzine, xylene and perchloroethylene.

Example 30

29 parts of aluminum ethylate, dissolved in 293 parts of xylene are cooled in an autoclave provided with a stirring device, by external cooling to +2° C. To the solution obtained there is added in the course of 1 hour and while stirring the solution of 45 parts of stearic acid in 80 parts of xylene, the temperature being kept at about +5° C. by external cooling. When the addition has been terminated, stirring is continued over night without external cooling, whereby the temperature rises to about +20° C. with partial separation of the reaction product. The solvent is then distilled off under reduced pressure, the temperature of the sump being maintained at about 20° C. There are obtained 57 parts of a yellowish, tough, wax-like substance which is soluble in cold carbon tetrachloride, benzine, benzene and ether.

Example 31

In a vessel provided with a stirrer and external cooling 135 parts of commercial oleic acid (molecular weight 270, iodine number 85) are added, at 15° C.–20° C., to 204 parts of aluminum isopropylate, dissolved in 2000 parts of benzene, and the mixture is stirred for 10 hours. A viscous clear solution of the condensation product of aluminum isopropylate and oleic acid in benzene is obtained. When the benzene is distilled off under reduced pressure at room temperature, 310 parts of a brittle wax-like white substance are obtained which is soluble in cold benzene, swells in cold carbon tetrachloride and is insoluble in benzine.

Example 32

In 460 parts of a solution of commercial aluminum ethylate in ethyl acetate (2.2 percent of aluminum), obtained by the process described in German Patent No. 386,688, 62 parts of sperm oil fatty acid (acid number 212, saponification number 214, iodine number 71) are dissolved, while stirring. After 10 hours the reaction product has deposited as an oil which is separated by means of a separating funnel. 160 parts of a yellowish oil are obtained which is soluble in cold carbon tetrachloride, benzene, and benzine.

Example 33

40 parts of aluminum ethylate are boiled for 1 night under reflux with 240 parts of nearly anhydrous alcohol (0.7 percent of water), as described by Bersin (Diss. Konigsberg, 1928, page 22), whereby a clear solution of an aluminum ethylate of the analytic composition $Al_1(OC_2H_5)_{2.1}$ is obained. In this hot solution 56 parts of commercial stearic acid (molecular weight 280, solidification point 52° C.) are dissolved, while stirring, at 60° C., and the clear solution of the condensation product of aluminum ethylate and commercial stearic acid is further boiled for 2 hours under reflux. The ethyl alcohol is distilled off first under atmospheric pressure, finally under reduced pressure. The condensation product of aluminum ethylate and commercial stearic acid is obtained as a viscous oil which solidifies, on cooling, in the form of a wax readily soluble in carbon tetrachloride and benzene.

When proceeding in the same manner but using, instead of stearic acid, a commercial sperm oil fatty acid (acid number 210, saponification number 212, iodine number 90) or a naphthenic acid (acid number 230), the condensation product of aluminum ethylate and sperm oil fatty acid or naphthenic acid is obtained as a viscous oil readily soluble in carbon tetrachloride and benzene.

Example 34

400 parts of a solution of readily soluble aluminum butylate of the analytic composition $Al_1(C_4H_9O)_{2.6}$, obtained by reaction of 20 parts of aluminum powder with 133 parts of n-butanol (content of water=2 percent) in 260 parts of boiling xylene are reacted with 95 parts of benzenesulfinic acid, while stirring, at 50° C. A clear solution of the condensation product of aluminum butylate and benzenesulfinic acid is obtained. After heating for 1 hour at 80° C., the xylene and the eliminated butanol are distilled off under reduced pressure. The condensation product of aluminum butylate and benzenesulfinic acid is obtained as a soft resin which is soluble in aromatic hydrocarbons, aliphatic esters and aliphatic chlorinated hydrocarbons.

When proceeding in the same manner but using, instead of benzenesulfinic acid, 94 parts of cyclohexanesulfinic acid or 78 parts of para-toluenesulfinic acid or 200 parts of alkylsulfinic acid of an average molecular weight of 280 [obtained in known manner from Fischer-Tropsch hydrocarbons (distilling at a temperature between 230° C. and 320° C., and having an average molecular weight of about 220, and an average chain-length of about $C_{16}$), by semisulfochlorination, reaction with sodium sulfite and separation of the unsaponifiable matter], the condensation product of aluminum butylate and cyclohexane- or para-toluene- or alkyl-sulfinic acid is obtained as a soft resin soluble in xylene.

Example 35

84 parts of a solution of aluminum ethylate of the analytic composition $Al_1(OC_2H_5)_{2.3}$, obtained by reaction of 40 parts of aluminum powder with 190 parts of ethanol of 95 percent strength in 500 parts of boiling xylene, are stirred, at room temperature, with 35 parts of palmitic acid. When the stearic acid has been dissolved, the clear yellowish solution of the condensation product of aluminum ethylate and palmitic acid is heated at 70° C. for 1 hour. The xylene and the eliminated ethanol are then distilled off, first at room temperature, finally under reduced pressure, and the condensation product is obtained in the form of a viscous oil which solidifies, on cooling, in the form of a soft wax which is readily soluble in aromatic and aliphatic hydrocarbons and chlorinated hydrocarbons.

When proceeding in the same manner but using, instead of palmitic acid, 40 parts of commercial stearic acid (molecular weight 275, solidification point 53° C.) or colophony, a brittle, elastic wax is obtained which is likewise soluble in aromatic and aliphatic hydrocarbons and chlorinated hydrocarbons.

Example 36

To 84 parts of the solution of aluminum ethylate—used in the process described in Example 35—9 parts of glacial acetic acid are added dropwise, while stirring. Slight spontaneous heating takes place, and a clear solution of the condensation product of aluminum ethylate and acetic acid is formed which is further stirred for 1 hour at 50° C. The xylene and the ethanol, which has been split off, are then removed by distillation under reduced pressure, and the condensation product of aluminum ethylate and acetic acid is obtained as a solid white resin; it is soluble in anhydrous ethanol and methanol.

When proceeding in the same manner but using, instead of glacial acetic acid, a solution of 18 parts of benzoic acid or 25 parts of ortho-chlorobenzoic acid in 60 parts of alcohol, the condensation product of aluminum ethylate and benzoic or ortho-chlorobenzoic acid is obtained in the form of a resin.

Example 37

221 parts of a di-(chloroethylate) of aluminum chloride of the formula $AlCl(OC_2H_4Cl)_2$, obtained by reaction of 1 mol of aluminum chloride in diethyl ether with 2 mols of ethyleneoxide are dissolved in 200 parts of benzene, and 140 parts of stearic acid (molecular weight 280, solidification point 54° C.) are then added, while stirring. While heating to 80° C., gaseous hydrochloric acid is separated, and a clear solution of the condensation product of aluminum chloroethylate and stearic acid is formed. The xylene is distilled off and the condensation product is obtained as a viscous oil which, on cooling, solidifies slowly to yield a tough wax soluble in aliphatic and aromatic hydrocarbons and halogenated hydrocarbons.

When proceeding in the same manner but using 240 parts of stearic acid or 150 parts of lauric acid, the condensation product of aluminum chloroethylate and stearic or lauric acid is obtained in the form of a wax-like substance having a better solubility.

Example 38

180 parts of di-isopropylate of aluminum chloride, obtained by reaction of 1 mol of acetyl chloride with aluminum isopropylate, are dissolved, while stirring, at about 50° C. in 720 parts of xylene, and 140 parts of stearic acid (molecular weight 280, solidification point 53° C.) or oleic acid are dissolved in this solution. The resultant xylene solution of the condensation product of the di-isopropylate of aluminum chloride and stearic or oleic acid is heated for 1 hour at 90° C., and the solvent is then distilled off under reduced pressure. A viscous oil is obtained as residue which, on cooling, solidifies slowly in the form of a very soft wax, which is soluble in aliphatic and aromatic hydrocarbons, chlorinated hydrocarbons, ethyl acetate and alcohol.

When proceeding in the same manner but using 252 parts of stearic acid or 300 parts of montanic acid (molecular weight 335), a hard wax of the same properties of solubility is obtained.

Example 39

270 parts of a xylene solution of aluminum ethylate (5 percent of aluminum), obtained from 160 parts of aluminum powder and 640 parts of ethanol of 95 percent strength in 1860 parts of boiling xylene, are mixed with 200 parts of anhydrous alcohol, and 70 parts of commercial stearic acid (molecular weight 270, solidification point 52° C.) are dissolved therein, while stirring, at about 30° C. Into this clear solution of the condensation product of aluminum ethylate and commercial stearic acid there is poured, while stirring, a solution of 60 parts of alkylsulfonic acid in 200 parts of absolute alcohol. This acid of the molecular weight of about 300 was obtained by subjecting a mixture of Fischer-Tropsch hydrocarbons—distilling at a temperature between about 230° C. and about 320° C. and having an average molecular weight of about 200—to semisulfochlorination, hydrolysis and separation of the unsaponifiable matter. While stirring for 1 hour at 75° C., a clear solution of the condensation product of stearic aluminum ethylate and alkylsulfonic acid is obtained. The solvent is distilled off under reduced pressure, and the condensation product is obtained in the form of a brittle resin which is soluble in aliphatic and aromatic hydrocarbons and halogenated hydrocarbons.

When proceeding in the same manner but using, instead of 60 parts of alkylsulfonic acid, 30 parts of paratoluenesulfonic acid, a resin of similar properties is obtained.

Example 40

First, a xylene solution of acetic aluminum ethylate is prepared as described in Example 36. 6 parts of stearic acid are then added, while stirring, at 50° C., and the solution is heated for 1 hour at 70° C. The solvent is then distilled off under reduced pressure, and the condensation product of acetic aluminum ethylate and stearic acid is obtained in the form of a tough wax which is soluble in aliphatic and aromatic hydrocarbons and chlorinated hydrocarbons.

When proceeding in the same manner but using, instead of acetic acid the corresponding amount of chloroacetic acid, formic acid or propionic acid, a wax-like resin soluble in xylene is likewise obtained.

Example 41

400 parts of the xylene solution of aluminum-n-butylate, as described in Example 34, are mixed, while stirring, with 400 parts of n-butanol; 100 parts of phthalic anhydride are added, and the mixture is heated to 70° C. A clear solution of the condensation product is obtained. After heating for 1 hour at 90° C., the solvent is distilled off under reduced pressure, and a sticky resin is obtained which is soluble in xylene and perchloroethylene.

When proceeding in the same manner but using, instead of phthalic anhydride, 125 parts of 4-chlorophthalic anhydride, a resin is obtained which is likewise soluble in xylene and perchloroethylene.

Example 42

10 parts of acetylacetone are added to a solution of 100 parts of the condensation product of aluminum ethylate and stearic acid in 2000 parts of carbon tetrachloride. The condensation product has been obtained by reacting 0.9 mol of stearic acid with 1 mol of aluminum ethylate.

The stabilizing effect is seen from the behavior of the solution on addition of aqueous alcohol. Whereas a nonstabilized solution remains clear after addition of absolute alcohol, basic aluminum stearate is separated when alcohol of 96 percent strength or more hydrous alcohol is added. Under the same conditions, however, no basic aluminum stearate is separated from the stabilized solution.

When using, instead of acetylacetone, 25 parts of acetoacetic ester, the same effect is obtained.

Example 43

A xylene solution of 1 mol of aluminum isopropylate is reacted at about 50° C. with 0.65 mol of stearic acid and the whole is heated to 90° C. To the resultant solution of the condensation product of aluminum isopropylate and stearic acid 0.3 mol of acetoacetic ester or acetylacetone is subsequently added, and the solution is heated for ½ hour at 60° C. The solution of the condensation product of aluminum isopropylate and stearic acid so obtained is stable against atmospheric moisture.

In the same manner a stabilized solution of the condensation product of aluminum isopropylate and oleic acid can be obtained.

Example 44

110 parts of a solution of commercial aluminum ethylate in ethyl acetate (2.2 percent of aluminum), obtained by the process described in German Patent No. 386,688, are reacted at about 50° C. with 11 parts of stearic acid and, the reaction terminated, about half of the ethyl acetate is distilled off at about 50° C. under reduced pressure. 4 parts of acetoacetic ester are then added to the solution, while stirring, and the ethyl acetate still present is distilled off, at 70° C. and under a pressure of about 100 millimeters of mercury.

By this method the condensation product of the aluminum ethylate and stearic acid is obtained in the form of a viscous oil which slowly solidifies, in the cold, to yield a soft wax.

The compound obtained is soluble in aliphatic and aromatic hydrocarbons, chlorinated hydrocarbons and ethyl acetate and is stable against moisture.

When proceeding in the same manner but using, instead of stearic acid, the corresponding amount of commercial sperm oil fatty acid (acid number 212, saponification number 214, iodine number 71), the stabilized condensation product of aluminum ethylate and sperm oil fatty acid is obtained as a viscous oil which is soluble in carbon tetrachloride and xylene.

Example 45

To 540 parts of a solution of commercial aluminum ethylate (2.5 percent of aluminum) in ethyl acetate, obtained by the process described in German Patent No. 386,688, 12 parts of glacial acetic acid are added dropwise, while stirring, at about 20° C., 54 parts of stearic acid (molecular weight 270, solidification point 53° C.) are then added and the whole is stirred at 60° C. for 1 hour. From the clear solution of the condensation product of acetic aluminum ethylate and stearic acid obtained the solvent is removed by distillation, and a soft resin is obtained as residue. In order to stabilize this resin against moisture, it is dissolved in 10 times its weight of methylene chloride, 22 parts of acetoacetic ester are added, and the solution is heated to 40° C. for 15 minutes. The methylene chloride is distilled off and the stabilized condensation product, free from solvent, is obtained in the form of a soft wax which is soluble in benzene, carbon tetrachloride and test benzine, and is stable against moisture.

When instead of acetoacetic ester, the corresponding amount of acetylacetone, acetonitrile or nitromethane is used for the stabilizing process, stabilized condensation products of acetic aluminum ethylate and stearic acid of analogous properties are obtained.

Example 46

In 160 parts of aluminum ethylate, dissolved in 1000 parts of xylene, 100 parts of benzoic acid are dissolved, while stirring, at about 50° C. To the clear solution of the condensation product of aluminum ethylate and benzoic acid obtained 65 parts of acetoacetic ester are added and stirring is continued for 15 minutes at about 60° C. By this operation a solution of the condensation product of aluminum ethylate and benzoic acid is obtained which is stable against moisture. The solvent is distilled off under reduced pressure and the condensation product is obtained in the form of a soft resin which is free from solvent and soluble in carbon tetrachloride and benzene.

Example 47

20 parts of aluminum isopropylate are dissolved in 100 parts of benzene, and the compound is stabilized against moisture by addition of 2.5 parts of acetylacetone while heating to 50° C. for a short time. The stabilization is demonstrated by the fact that from a test portion to which isopropanol of 95 percent strength has been added aluminum hydroxide is no longer precipitated. In the stabilized benzene solution so obtained 14 parts of stearic acid (molecular weight 270, solidification point 52° C.) are dissolved, while stirring, at about 50° C., and the clear solution is heated to 80° C. for ½ hour. The solvent is distilled off under reduced pressure, and the stabilized condensation product of aluminum isopropylate and stearic acid is obtained in the form of a soft wax which is soluble in xylene, carbon tetrachloride and test benzine.

*Example 48*

To 100 parts of a solution of commercial aluminum ethylate in ethyl acetate (2.7 percent of aluminum), obtained according to the process described in German Patent No. 386,688, 6 parts of acetoacetic ester are added dropwise and the product is stabilized against moisture by heating for ½ hour to about 40° C. The stabilization is demonstrated by the fact that from a test portion to which alcohol of 96 percent strength has been added aluminum hydroxide is no longer precipitated. 10 parts of benzoic acid are then added, while stirring. The clear mixture is boiled for ½ hour under reflux, and the solvent is distilled off under reduced pressure. The condensation product of stabilized aluminum ethylate and benzoic acid is obtained as a residue in the form of a resin which is soluble in alcohol.

When proceeding in the same manner but using, instead of benzoic acid, 18 parts of lauric acid, the stabilized condensation product of aluminum ethylate and lauric acid is obtained as a soft wax which is soluble in carbon tetrachloride, test benzine and benzene.

*Example 49*

To 510 parts of the stabilized solution of aluminum ethylate, described in Example 48, 12 parts of glacial acetic acid are added dropwise, while stirring, at about 20° C., and 60 parts of stearic acid are dissolved therein, while stirring, at about 50° C. The solvent is distilled off, finally under reduced pressure, from the clear solution of the stabilized condensation product of acetic aluminum ethylate and stearic acid, and a soft resin is obtained which is soluble in carbon tetrachloride and xylene.

When proceeding in the same manner but using, instead of glacial acetic acid, the corresponding amount of formic acid or, instead of stearic acid, the corresponding amount of sperm oil fatty acid, the same results are obtained.

We claim:

1. The process for preparing stable high molecular acid aluminum alcoholates containing less than one acid radical per aluminum atom which comprises reacting 1 mol of an aluminum alcoholate with less than one mol of a monobasic organic acid capable of forming salts with aluminum at a temperature ranging from about 40° C. to 140° C. and in the presence of a lower alkyl ester of an aliphatic hydroxycarboxylic acid as a volatile complex forming organic compound.

2. The process for preparing stable high molecular acid aluminum alcoholates containing less than one acid radical per aluminum atom which comprises reacting 1 mol of an aluminum alcoholate with less than one mol of a monobasic organic acid capable of forming salts with aluminum at a temperature ranging from about 40° C. to 140° C. and in the presence of an oxime of a carbonyl-substituted alkane.

3. The process for preparing high molecular acid aluminum alcoholates containing less than one acid radical per aluminum atom which comprises contacting in an inert organic solvent at a temperature ranging from about 40° C. to 140° C. an aluminum alcoholate containing up to four carbon atoms in the alcohol radicals with less than the equimolar amount of a monobasic organic acid capable of forming salts with aluminum, whereby a primary monosalt of the aluminum alcoholate soluble in said inert organic solvent is first formed and the monosalt reacts further with the excess alcoholate to form acid aluminum alcoholates also soluble in said inert organic solvent.

4. The process for preparing high molecular acid aluminum alcoholates containing less than one acid radical per aluminum atom which comprises reacting at a temperature ranging from about 40° C. to 140° C. an aluminum alcoholate containing up to four carbon atoms in the alcohol radicals with less than the equimolar amount of a monobasic organic acid capable of forming salts with aluminum, whereby a primary monosalt of the aluminum alcoholate is first formed and the monosalt reacts further with the excess alcoholate.

5. The process defined in claim 4, wherein the aluminum alcoholate on the average contains less than 1 organic radical bound to the aluminum atom through an oxygen atom.

6. The process defined in claim 4, wherein the reaction is effected in the presence of an aliphatic volatile complex forming organic compound selected from the group consisting of lower alkyl esters of aliphatic hydroxycarboxylic acids, oximes of carbonyl-substituted alkanes, compounds containing a group capable of desmotropic rearrangement to the aci-form, compounds containing a reactive methylene group, hydroxy-oxo-compounds, and aliphatic nitriles, whereby the acid aluminum alcoholates are stabilized against moisture.

7. The process defined in claim 4, including the further step of adding an aliphatic volatile complex forming organic compound selected from the group consisting of lower alkyl esters of aliphatic hydroxycarboxylic acids, oximes of carbonyl-substituted alkanes, compounds containing a group capable of desmotropic rearrangement to the aci-form, compounds containing a reactive methylene group, hydroxy-oxo-compounds, and aliphatic nitriles, whereby the acid aluminum alcoholates are stabilized against moisture.

8. The process defined in claim 4, wherein the monobasic organic acid is a monocarboxylic acid.

9. The process defined in claim 4, wherein the monobasic organic acid is an aliphatic monocarboxylic acid.

10. The process defined in claim 4, wherein the monobasic organic acid is a higher aliphatic monocarboxylic acid.

11. The process defined in claim 4, wherein a part of the monobasic organic acid is added at a low temperature to a solvent containing the aluminum alcoholate, and then the balance of the acid is added while the temperature is raised between 10° C. to 40° C. above said low temperature.

12. The condensation product produced in accordance with the process of claim 4.

13. The process for preparing high molecular acid aluminum alcoholates containing less than one acid radical per aluminum atom which comprises reacting in the absence of a solvent at a temperature ranging from about 40° C. to 140° C. a molten aluminum alcoholate containing up to four carbon atoms in the alcohol radicals with less than the equimolar amount of a monobasic organic acid capable of forming salts with aluminum, whereby a primary monosalt of the aluminum alcoholate is first formed and the monosalt reacts further with the excess alcoholate.

14. The process defined in claim 4 wherein the entire amount of monobasic organic acid is added at a temperature below 40° C. to a solvent containing the aluminum alcoholate, and the reaction mixture is thereafter heated.

(References on following page)

References Cited in the file of this patent

UNITED STATES PATENTS 2,582,833   Hunn _____ Jan. 15, 1952

FOREIGN PATENTS 503,437   Belgium _____ June 15, 1951

OTHER REFERENCES

Eigenberger: "Fette und Seifen," Heft 7, July (1942), pp. 505–508.

Gray et al.: J. Physical and Colloid Chem., vol. 53 (1949), pp. 23–38.

Parry et al.: "Trans. Faraday Soc." 46 (1950), pp. 305–10.